Feb. 27, 1968  K. SCHRAUF  3,370,555
DOUGH WORKING APPARATUS
Filed Oct. 22, 1965  4 Sheets-Sheet 2
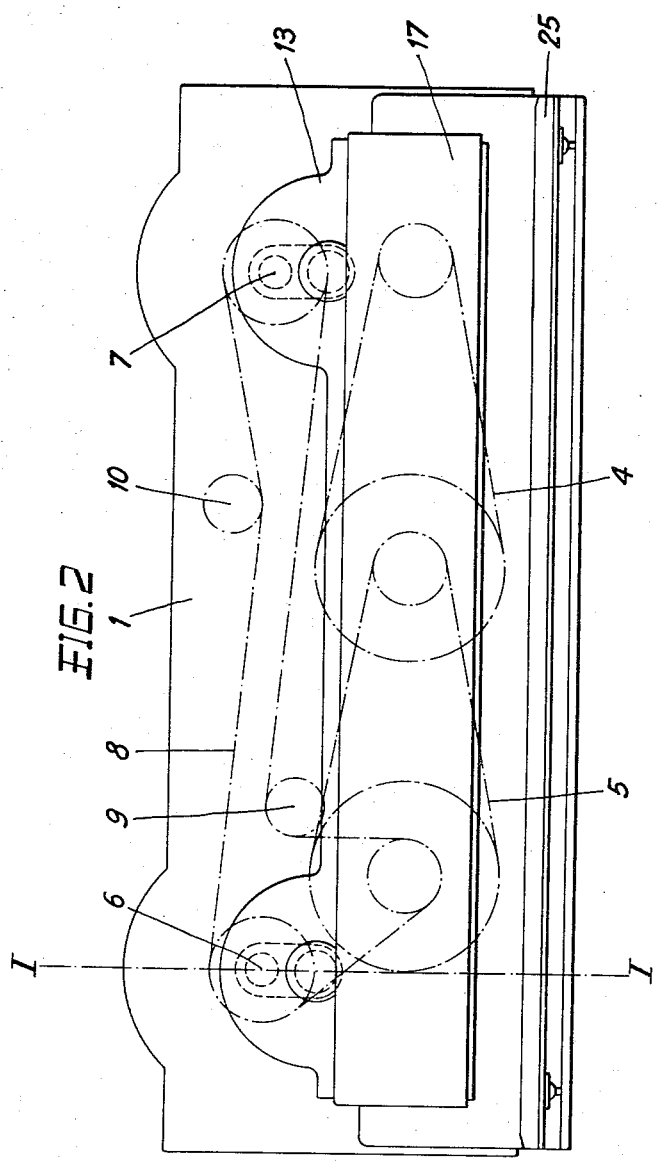

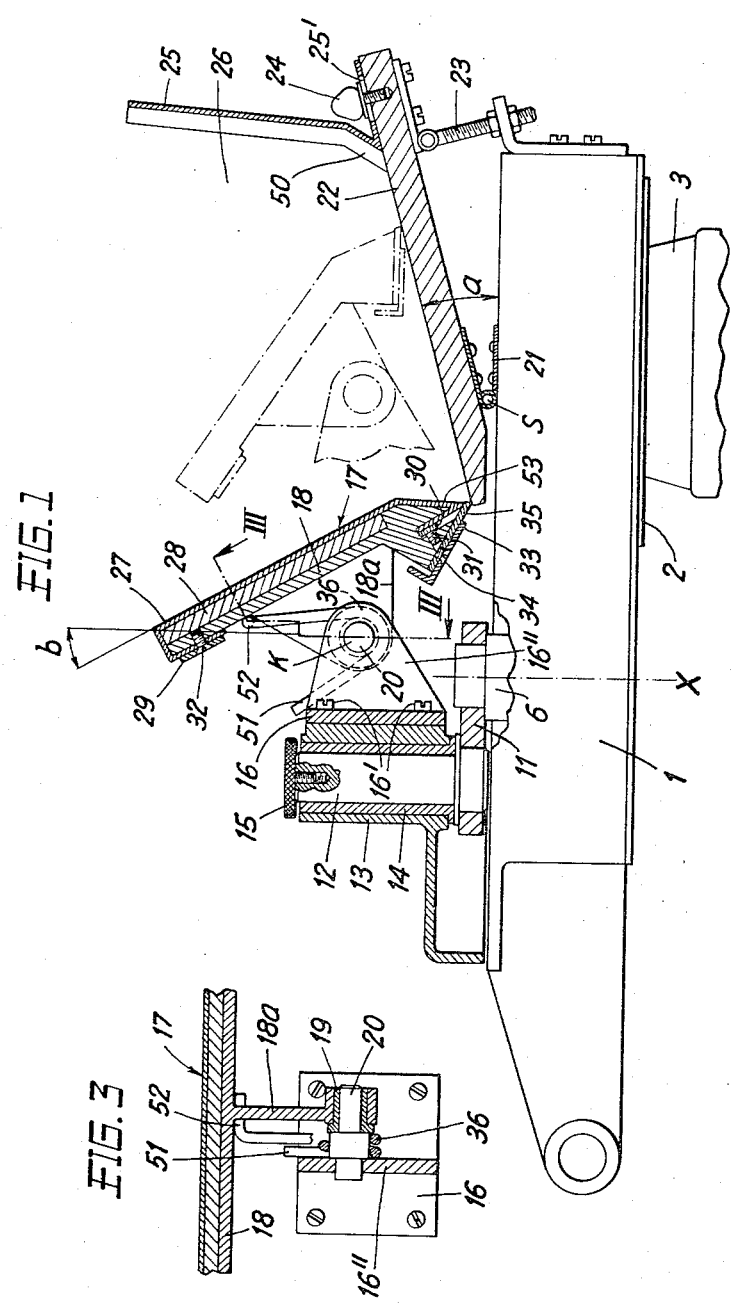

Feb. 27, 1968 K. SCHRAUF 3,370,555
DOUGH WORKING APPARATUS
Filed Oct. 22, 1965 4 Sheets-Sheet 3
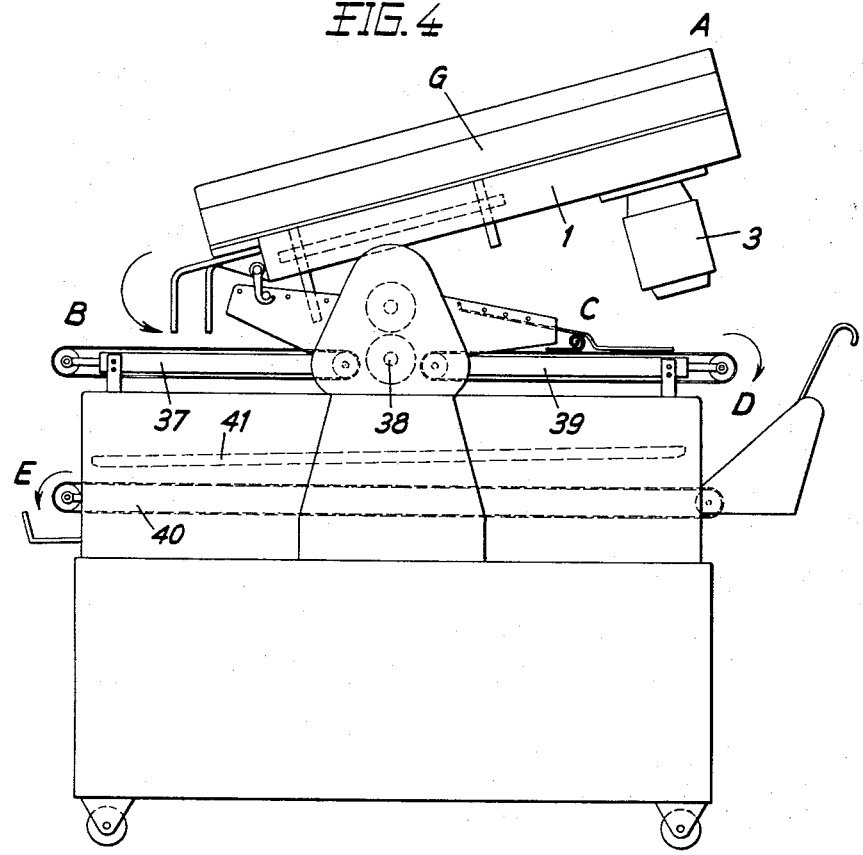

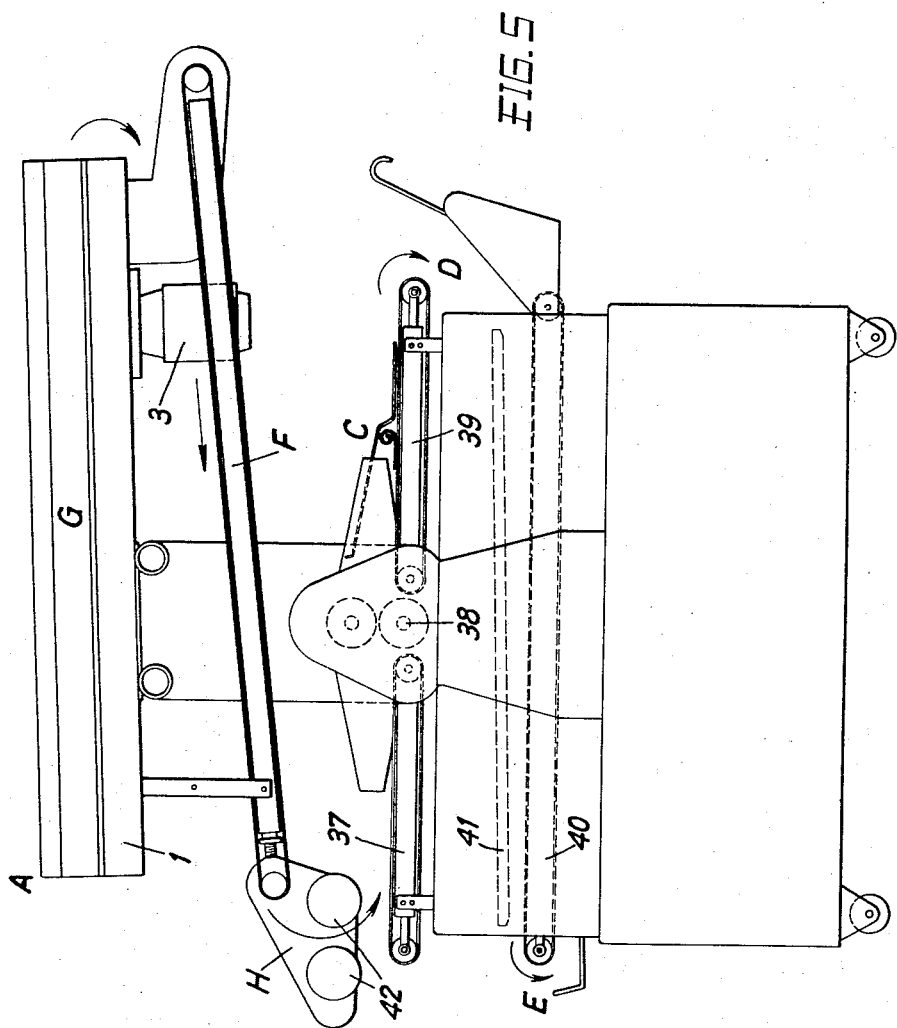

United States Patent Office 3,370,555
Patented Feb. 27, 1968

3,370,555
DOUGH WORKING APPARATUS
Karl Schrauf, Gisingen, near Feldkirch, Vorarlberg, Austria, assignor to Gustave A. Seewer, Burgdorf, Bern, Switzerland
Filed Oct. 22, 1965, Ser. No. 501,455
Claims priority, application Switzerland, Apr. 7, 1965, 4,814/65
13 Claims. (Cl. 107—9)

The present invention relates to apparatus for working dough of the type which is used in the making of baked food products, such as, bread, pastry, etc., and more particularly, the present invention relates to an apparatus for working individual pieces of dough into a generally spherical or pear-shape.

As is well known, dough is prepared by first mixing such ingredients as flour, water, yeast, etc., thereby producing a relatively large bulk mass of dough. Then individual pieces of dough are cut or torn away from the bulk mass and processed into the desired shape of individual bread loaves or rolls, or pastry shapes, etc. A preliminary step in this processing as when it is desired to produce round bread form, is that of working the just cut individual dough piece into a generally spherical or pear-shape. This preliminary step is carried out manually by skilled bakery workers who work the dough pieces with their bare hands in a manner whereby the dough surface is stretched and pulled towards an apex point. This working of the dough piece transforms it from an irregular-shape resembling the shape of a large piece of crushed stone, into a generally spherical or pear-shape with the dough piece having a stretched, smooth surface, somewhat in the nature of an outer skin. The manual operation is, however, laborious, time consuming, and costly.

Although mechanical kneading (dough molding) apparatus is well known, there is no prior known apparatus which is capable of providing the stretching and smoothing effect on the rough dough piece, the stretching effect being particularly essential to the obtention of a smooth surfaced dough piece. For example, in one known kneading apparatus, the dough is rolled against a stationary, downwardly concave surface of an elongated sheet metal member by means of an elongated movable kneading member which is arranged to perform dough rolling motions by moving parallel and perpendicular to the axis of the concave surface. The dough rolling motions result from the fact that the kneading member is pivotally mounted at its ends to pins on rotating discs. Further, the opening provided for the passage of dough between the kneading member and the concave surface becomes progressively smaller from inlet to outlet end of the apparatus. Although the dough undergoes a kneading (molding) treatment in its passing through such apparatus, there is not any stretching or consequent smoothing of the dough surface.

It is, therefore, an object of this invention to provide an apparatus which is capable of performing a stretching and smoothing effect upon a dough piece surface.

It is a further object of this invention to provide such an apparatus which is capable of working a piece of dough into a smooth spherical or pear-shape.

It is a further object of this invention to provide an apparatus of the aforementioned type which is easily adaptable for use in conjunction with known types of dough sheeting and molding machines.

It is a further object of this invention to provide a mechanical means for working a rough piece of dough into a smooth, spherical or pear-shape and thereby eliminate the heretofore necessary corresponding manual working of such dough.

It is a further object of this invention to provide an apparatus for working dough in order to provide a saving in labor, time, and cost in the overall dough preparation process relative to heretofore known means for preparing such dough.

The objects of this invention are generally realized through an arrangement whereby a circularly moving kneading member works a dough piece against a stationary kneading surface, with the movable member simultaneously shifting its dough contacting surface in a downward and inward direction relative to the dough piece, the shifting motion acting to pull and stretch the dough towards an apex point beneath the dough piece while the circular motion serves to knead and to transport the dough in a forward direction through the apparatus.

The stated objects and others will become apparent from a reading of the following detailed description which is referred to the accompanying drawings, in which:

FIGURE 1 is a cross-sectional view taken along line I—I in FIGURE 2, and is on a larger scale than FIGURE 2;

FIGURE 2 is a plan view of the apparatus according to this invention;

FIGURE 3 is a cross-sectional detail view taken along line III—III in FIGURE 1 and shows the details of the pivotal mounting means for the moving kneading member;

FIGURES 4 and 5 respectively are elevation views of two different dough working machines which are arranged to function in conjunction with the dough working apparatus of this invention.

With reference to FIGURES 1–3, the apparatus of this invention includes a housing 1, closed by a flat bottom plate 2, to the exterior of which is secured by known means an electrical drive motor 3. Within the housing 1 there is mounted a power transmission assembly for transmitting driving power from motor 3 to the moving kneading member generally denoted by 17.

With reference to FIGURE 2, the motor drives the belts 4 and 5 which in turn directly drive one of the parallel crank members 6 or 7. The directly driven crank member 6 or 7, in turn is drivingly connected to the other crank member by means of a chain or belt 8 which passes over idler rollers 9 and 10 which are adjustably mounted on housing 1. The transmission ratios are such that both crank members 6 and 7 are rotated at the same speed. Each crank member 6 and 7 is drivingly connected, by means hereafter described, to opposite end portions of an elongate (as seen in FIGURE 2) kneading member 17. It is essential, therefore, that both crank members 6 and 7 are operated in synchronism since they both actuate a single kneading member. Of course, depending upon the length of member 17, more or fewer crank members may be connected thereto.

Returning to FIGURE 1, the crank member 6 includes a crank web 11 extending radially from the member 6 and a crank pin 12 extending parallel to member 6. Pin 12, web 11, and member 6 are all rigid with one another so that rotation of member 6 causes web 11 and pin 12 to revolve about the axis of 6. The related construction for member 7 is identical to that for member 6 so that all that is mentioned relative to member 6 is applicable to member 7. The radius of web 11 for member 6 is arranged to run parallel to the radius of the corresponding web for member 7 through adjustment of idler rolls 9 and 10 during assembly of the apparatus.

Each crank pin 12 is surrounded by a bearing bushing 14 and pivotally mounted about said bushing is sleeve 13. Sleeve 13 is prevented from axially sliding off one end of bushing 14 by means of a screw threaded into the end of pin 12 and having a large diameter head 15 which overlaps the edge of sleeve 13. Conversely, removal of said screw permits removal of sleeve 13 for replacement or assembly purposes, etc.

Attached to the sleeve 13 as by screws 16' are plate members 16 from each of which radially extends a rigid lug 16" (see FIGURE 3). Rigidly mounted in the outer end of lug 16" is a pivot pin 20 having a bearing bushing 19 mounted thereon.

The movable kneading member 17, comprises a rigid plate 18 having lugs 18a rigidly extending transversely from the rear face thereof. Each lug 18a is pivotally mounted on bushing 19 of the corresponding plate member 16, and it is, therefore, clear that plate 18 is pivotally supported on sleeve 13 for pivoting motion about axis K and that at the same time axis K can be driven to perform a circular translation movement in a plane perpendicular to axis X.

Although only one lug 16" and one lug 18a have been shown, it is possible to provide more than one of each of said lugs for each pivotal mounting of plate 18 on plate member 16. It is of course understood that plate 18 is pivotally mounted relative to crank member 7 in the same manner as above described relative to member 6.

The stationary kneading surface is provided by a kneadplate 22 which is pivotally mounted on housing 1 by means of hinge 21 whose axis S is parallel to axis K. An adjusting device 23 provides a means for adjustably securing plate 22 in an angular relationship, a, relative to a plane perpendicular to axis X, said angular relationship being variable in the range of about 10 to 25 degrees.

A backing plate 25 extends generally transversely to plate 22 and for substantially the full length thereof. Backing plate 25 includes a bent flange portion having oblong holes 25' therein. Plate 25 is adjustably secured to plate 22 for adjustment in the direction of member 17 to an extent equal to the length of holes 25', with the said flange portion resting upon the upper surface of plate 22, by means of screws 24 which pass through the oblong holes and are received in plate 22.

Backing plate 25 in conjunction with kneading member 17 and kneading plate 22, define respectively the sides and bottom of an elongate channel 26, one transverse section of which is shown in FIGURE 1, through which a dough piece is transported under the action of the kneading member 17 from inlet to outlet ends thereof. The transverse width of the channel 26 becomes progressively smaller from inlet to outlet ends by virtue of backing plate 25 being correspondingly inclined towards member 17. The angle of inclination can be varied by loosening screws 24 and simply transversely shifting one end of plate 25 more or less than the other end relative to screws 24. It is obvious that the extent to which the angle of inclination is variable is limited to the length of the oblong holes 25'. Furthermore, the inclination angle may be varied more or less over different portions of the length of the channel 26.

As seen in the plane of FIGURE 1, the backing plate 25 includes a lower portion 50 which is immediately adjacent to the plate 22 and which is inclined inwardly downwardly, that is, towards member 17, while lowermost portion 53 of member 17 is inclined in the opposite direction while member 17 is at its furthest distance from plate 25. It is seen, therefore, in FIGURE 1, that the wall portions 50 and 53 tend to stretch the lower portion of the dough piece surface towards the middle of the dough piece, this action being especially obvious as wall portion 53 tilts from the solid line to the dash line position.

The front face of plate 18, of the movable kneading member 17, is covered by an intermediate layer 28 of elastically deformable material, e.g., a sponge rubber, which serves as a cushion between rigid back plate 18 and the outermost front sheet 27, which may be a felt material.

As is also seen in FIGURE 1, the felt sheet 27 extends over the whole width of member 17 and is folded back over the top and bottom edges of plate 18 and layer 28 and is secured at the back side of plate 18 by washers 29 and 30 and screws 32 and screw pins 31. Layer 28 does not extend all the way down to the bottom edge of plate 18, but does extend over a major portion of the plate width, that is, in an up and down direction, up to the vicinity of the top edge of plate portion 53.

A doctor blade 35 is secured by means of clamping member 33 and screws 34 against an inclined lower surface of plate member 18. The doctor blade serves to scrape the dough from the upper surface of wall 22 if plate 25 is subdivided in portions along its length.

A coil spring 36 is coaxially mounted about pivot pin 20 and includes two opposite end extensions 51 and 52. End extension 51 bears against lug member 16 while end extension 52 bears against one side of lug 18a whereby the tension of spring 36 acts to continuously urge member 17 to pivot about axis K in the clockwise direction as referred to in FIGURE 1, that is, in a direction whereby the doctor blade 35 is continuously pressed against the upper surface of kneading plate 22. It is noted here that the upper surface of plate 22 is flat and smooth.

The operation of the above described apparatus is as follows.

The rotation of drive motor 3 is transmitted through the transmission means 4, 5, 8 to rotate the crank members 6 and 7 in the same direction and at the same speed. The crank members 6 and 7 in turn act through crank webs 11 to revolve the crank pins 12 about respective axes X. If it is kept in mind that sleeve 13 is pivotally mounted about pin 12, it will be seen that sleeve 13 does not revolve together with pin 12 but instead the revolving motion of pin 12 about axis X causes a reciprocatory motion of member 17 simultaneously along two transverse axes, that is: member 17 actually scribes a circular trajectory which is equivalent to its reciprocating in a direction parallel to the length of plate 25 and in a direction towards and away from plate 25. The solid and dash line positions of member 17 as shown in FIGURE 1 represent the extreme positions between which 17 reciprocates in a direction towards and away from plate 25.

As member 17 moves in its circular trajectory, its doctor blade 35 slides along the top surface of plate 22 since spring 36 continuously biases member 17 in the clockwise direction. Furthermore, since the top surface of plate 22 is inclined at angle a relative to the plane in which pivot pin 20 revolves, member 17 must be necessarily pivot counter-clockwise, against the bias of spring 36, when it moves from the solid line to the dashed line position of FIGURE 1.

In the solid line position, the active working surface of member 17, that is: the outer or front face of felt sheet 27, is inclined at angle b relative to axis X, and in the dash line position angle b is from 10–25 degrees greater than in the first mentioned position. This pivoting or tilting motion of of working surface of member 17 has the effect of pulling and stretching the dough surface downwardly towards the underside of the dough piece each time member 17 moves towards backing member 25, that is: during one-half of the circular trajectory of member 17. Since this tilting motion is superimposed upon the circular translatory motion of the member 17, the overall effect is a very close simulation of the hand motions which are executed by a bakery worker in rolling a dough piece into a spherical or pear-shape. The result, therefore, is that the motions of member 17 transforms a rough, irregular dough piece into a smooth, generally spherical or pear-shaped ball.

The above described apparatus is adapted to be easily applied to conventional dough working machines such as those shown in FIGURES 4 and 5, for use in conjunction therewith.

In FIGURES 4 and 5, the apparatus of this invention is denoted by the symbol G, and it is shown as constituting the uppermost component of a dough working machine. In the machine of FIGURE 4, the cut dough pieces are delivered, for example from a weighing device, to the inlet end A of the dough feeding channel 26. The dough piece is advanced along the channel 26 (from right to left in FIGURE 4) under the urging of the translatory motion of member 17 until the dough piece, in the form of a smooth ball falls out of the outlet end B of channel 26 and onto the conveyor 37. It will here be noted that in FIGURE 4 the apparatus G of this invention is mounted in a downwardly inclined position from inlet to outlet ends of channel 26. A purpose of this inclination is to provide a natural tendency for the dough piece to advance towards the outlet end B of the channel 26.

Conveyor 37 conveys the pre-kneaded dough pieces to a well known type of sheeting means which comprises two superimposed sheeting rollers 38 between which the ball of dough is repeatedly passed and thereby flattened into the form of a sheet. The dough sheet is then rolled in a well known manner at C while it is being carried on conveyor 39. At D the rolled sheet of dough falls onto a third conveyor 40 which carries the rolled sheet for the full length of the machine and discharge it at E onto a receiver plate or onto another conveyor. Conveyor 40 operates in conjunction with a known type of kneading device, such as inclined stationary plate 41, in order to knead the rolled sheet during its travel from D to E.

The machine of FIGURE 5 is similar to that of FIGURE 4 excepting that the rolled dough ball is discharged from G at the outlet end of channel 26 onto a conveyor F which carries and feeds the dough ball to between rollers 42 of flattening device H, wherefrom the flattened dough pieces fall onto conveyor 37 which is analogous to conveyor 37 of FIGURE 4.

The apparatus G of this invention may either be assembled as an integral component of machines, such as those of FIGURES 4, 5 or it may be constructed on an independent carriage or support structure which is selectively movable into and out of operative cooperation with a known type of dough working machine, such as those of FIGURES 4 and 5.

It is to be understood that the apparatus of this invention is susceptible of many modifications and adaptations which are well within the province of one skilled in the art. The details of the herein disclosed embodiments are not intended to be limitative, but are only intended to be illustrative of a preferred realization of the inventive concept which is herein disclosed. The scope of the invention, therefore, is intended to cover all obvious modifications, adaptations, and equivalents.

What is claimed is:

1. A dough working apparatus for transforming an irregular shaped, rough surface piece of bulk dough into a generally spherical, smooth surfaced ball, said apparatus comprising: a channel for receiving a piece of bulk dough therein, said channel being defined by a bottom wall extending between spaced apart upstanding side wall members, one of said side wall members being movable relative to said bottom wall and relative to the other said side wall member, drive means connected to said movable member to move said movable member in an arcuate path relative to the upper surface of said bottom wall, said movable member being pivotally mounted about an axis which is parallel to the plane of said bottom wall surface, means for urging said movable member to pivot about said axis in one rotative direction whereby said movable member tilts from an upstanding to a less upstanding position relative to the upper surface of said bottom wall.

2. The apparatus of claim 1, wherein said drive means is drivingly connected to said movable side wall member to drive said pivot axis of said movable member in a circular path in a plane angularly intersecting the plane of said bottom wall, said bottom wall being substantially flat, said movable member having an end thereof in sliding engagement upon the upper surface of said bottom wall whereby said movable member is forced to pivot about its pivot axis in conformity to said end sliding along the upper surface of said bottom wall.

3. The apparatus of claim 2, wherein said end of said movable side wall member comprises a doctor blade in sliding engagement upon the upper surface of said bottom wall.

4. The apparatus of claim 1, including means urging said movable member to pivot in an opposite rotative direction to said one rotative direction.

5. The apparatus of claim 1, wherein said movable member is pivotally mounted on a support means, said support means being revolvable about an axis which is perpendicular to said movable member pivot axis, said support means being drivingly connected to said drive means.

6. The apparatus of claim 5, wherein said drive means comprises a rotatable first crank member, a crank web extending radially from said first crank member, a second crank member extending axially from said web, said second crank member being revolvable about the rotative axis of said first crank member, said support means connecting said movable side wall member to a radial portion of said second crank member.

7. The apparatus of claim 6, wherein said first and second crank members and said web are rigidly connected together, said support means comprising a sleeve pivotally mounted coaxially on said second crank member, said movable side wall member being pivotally mounted on a radial portion of said sleeve about an axis extending perpendicular to the rotative axis of said first crank member.

8. The apparatus of claim 1, wherein said channel is elongate between dough inlet and outlet ends thereof, said other side wall member being stationarily fixed along one edge of said bottom wall and said movable side wall member being movable along a continuous arcuate path over the upper surface of said bottom wall with said movable member alternately moving towards and away from the stationary member during movement of said movable member along respective half-segments of said arcuate path, said movable member being tiltable about its pivot axis between first and second tilt positions each of which corresponds to a working surface of said movable member defining an extreme inclined angle relative to the upper surface of said bottom wall.

9. The apparatus of claim 8, said stationarily fixed side wall member being inclined towards the plane of said movable side wall member in a direction towards said outlet end of said channel.

10. The apparatus of claim 8, wherein said first and second tilt positions respectively corresponds to said movable member being at its furthest and nearest distances, respectively, from the stationary side wall member, in said second tilt position said working surface extending less uprightly relative to said bottom wall than in said first tilt position.

11. The apparatus of claim 10, wherein said movable member tilts in the range of 10–25 degrees in moving from said first to said second tilt positions.

12. The apparatus of claim 10, said bottom wall being adjustably mounted to extend in different planes parallel to the pivot axis of said movable side member, means to secure said bottom wall in any one of said planes.

13. The apparatus of claim 10, wherein the lowermost portion of said stationarily fixed side wall member is inclined downwardly inwardly, towards said movable member, and the lowermost portion of said movable member is inclined downwardly outwardly, away from said stationarily fixed side wall member, when said movable member is at said first tilt position.

References Cited

UNITED STATES PATENTS

| 947,500 | 1/1910 | Streich | 107—9 |
| 978,233 | 12/1910 | Streich | 107—9 |
| 1,037,797 | 9/1912 | Ruffin | 107—9 |

FOREIGN PATENTS

| 292,962 | 7/1916 | Germany. |

WALTER A. SCHEEL, *Primary Examiner.*
A. O. HENDERSON, *Assistant Examiner.*